(12) United States Patent
Katano et al.

(10) Patent No.: US 6,730,769 B2
(45) Date of Patent: May 4, 2004

(54) NOVOLAK RESIN, PRODUCTION PROCESS THEREOF AND POSITIVE PHOTORESIST COMPOSITION USING THE NOVOLAK RESIN

(75) Inventors: Akira Katano, Kanagawa (JP); Mitsuo Hagihara, Kanagawa (JP); Ken Miyagi, Kanagawa (JP); Toshiaki Tachi, Kanagawa (JP)

(73) Assignee: Tokyo Ohka Kogyo Co., Ltd., Kanagawa (JP)

( * ) Notice: Subject to any disclaimer, the term of this patent is extended or adjusted under 35 U.S.C. 154(b) by 0 days.

(21) Appl. No.: 10/135,769

(22) Filed: May 1, 2002

(65) Prior Publication Data
US 2003/0065126 A1 Apr. 3, 2003

(30) Foreign Application Priority Data
May 9, 2001 (JP) ..................................... 2001-139089

(51) Int. Cl.$^7$ ............................................... C08G 14/04
(52) U.S. Cl. ...................... 528/129; 528/144; 528/150; 430/190; 430/191; 430/192; 430/193
(58) Field of Search ................................. 528/129, 144, 528/150; 430/190, 191, 192, 193

(56) References Cited

U.S. PATENT DOCUMENTS 6,120,969 A * 9/2000 Hagihara et al.

* cited by examiner

Primary Examiner—Duc Truong
(74) Attorney, Agent, or Firm—Sughrue Mion, PLLC

(57) ABSTRACT

(i) As a primary reaction, m-cresol is allowed to react with propionaldehyde in the presence of an acid catalyst and thereby yields a polymer having a weight average molecular weight Mw of 200 to 500 and a molecular weight distribution Mw/Mn of 1.7 or less, and (ii) as a secondary reaction, the polymer is allowed to react with 3,4-xylenol and formaldehyde and thereby yields a novolak resin having an Mw of 1000 to 20000. By adding a specific photosensitizer, the novolak resin yields a positive photoresist composition.

9 Claims, No Drawings

US 6,730,769 B2

NOVOLAK RESIN, PRODUCTION PROCESS THEREOF AND POSITIVE PHOTORESIST COMPOSITION USING THE NOVOLAK RESIN

BACKGROUND OF THE INVENTION

1. Field of the Invention

The present invention relates to a novolak resin that exhibits excellent sensitivity, definition and short margin (the difference between optimum exposure time period Eop and minimum exposure time period Es) and is advantageously used in positive photoresist compositions for i-line lithography, as well as to a production process of the novolak resin and to a positive photoresist composition using the novolak resin.

2. Description of the Related Art

As positive photoresist composition for i-line (365 nm) lithography, compositions each comprising an alkali-soluble novolak resin and a 1,2-naphthoquinonediazido-group-containing compound are excellent in sensitivity, definition and heat resistance and are widely used in, for example, the manufacture of semiconductor integrated circuits (ICs).

The density of such ICs becomes denser and denser with advance of semiconductor technologies, and demands have been made on photoresist materials that can form ultrafine resist patterns of not more than half a micron with good shapes.

Such photoresist materials should have a higher sensitivity to improve throughput and should have a satisfactory short margin (Eop-Es) to improve yields.

The short margin (Eop-Es) is the difference between the minimum exposure time period (Es) to reproduce separated resist patterns and the exposure time period (Eop) to reproduce patterns in exact accordance with set dimensions of a mask pattern. A larger short margin means a smaller change rate in pattern dimensions depending on exposure conditions. Photoresist materials having a larger short margin exhibit improved yields and are easy to handle.

However, conventional positive photoresist compositions do not satisfy all the required characteristics including sensitivity, definition, short margin and pattern shape upon the formation of ultrafine resist patterns of not more than half a micron. For example, positive photoresist compositions exhibiting a higher sensitivity may cause reduced resist films after development and may have an insufficient definition, pattern shape and short margin. In contrast, those exhibiting a higher definition may have a deteriorated sensitivity.

Conventional alkali-soluble novolak resins for use in the positive photoresist compositions are generally prepared using two or more types of phenols as raw materials. Among them, novolak resins prepared by using m-cresol and p-cresol as essential ingredients are excellent in balance between sensitivity and definition and are widely used.

However, p-cresol is a monomer having low reactivity, and a substantial portion of p-cresol used in the reaction remains as unreacted monomers or as dimers, trimers and other low molecular weight fractions in the resulting product resin, and these substances cause scum in patterning of resists and cause deteriorated the characteristics as the resist.

For these reasons, resist compositions containing novolak resins prepared by using highly reactive 3,4-xylenol instead of lowly reactive p-cresol have been proposed.

For example, Japanese Patent Laid-Open No. 4-365046 discloses a positive photoresist composition comprising a novolak resin and a naphthoquinonediazidosulfonyl ester having a specific structure. The novolak resin is obtained by condensation of formaldehyde with phenols including m-cresol and at least one selected from p-cresol, xylenols and trimethylphenols.

Japanese Patent Laid-Open No. 5-88364 discloses a positive photoresist composition containing a novolak resin prepared by polycondensation of formaldehyde with a phenol mixture comprising 5% to 50% by mole of 3,4-xylenol and 95% to 50% by mole of m-cresol.

Japanese Patent Laid-Open No. 5-204146 discloses a positive photoresist composition containing a polycondensation product (a novolak resin) of an alkyl-substituted phenolic compound with an aldehyde mixture containing formaldehyde and a lower-alkyl-group-containing aldehyde, such as propionaldehyde. The molar ratio of formaldehyde to the lower-alkyl-group containing aldehyde in the aldehyde mixture is 1/99 to 99/1.

Japanese Patent Laid-Open No. 8-234420 mentions a positive photoresist composition containing an alkali-soluble novolak resin that has a weight average molecular weight Mw of from 2000 to 15000 and is prepared by reaction of m-cresol, 3,4-xylenol and formaldehyde in γ-butyrolactone.

These conventional photoresist compositions are, however, still insufficient in the aforementioned required characteristics upon the formation of ultrafine resist patterns of not more than half a micron, although they are suitable for the formation of patterns of about 0.6 μm.

SUMMARY OF THE INVENTION

Accordingly, an object of the present invention is to provide a positive photoresist composition that satisfies all the required characteristics of sensitivity, definition, short margin and pattern shape even in the formation of ultrafine resist patterns of not more than half a micron.

Another object of the present invention is to provide a novolak resin that is suitable for the preparation of the positive photoresist composition, and a process for producing the novolak resin.

After intensive investigations to accomplish the above objects, the present inventors have found that a positive photoresist composition including an alkali-soluble novolak resin having a specific structure and a naphthoquinonediazidosulfonyl ester of a phenol compound having a specific structure satisfies all the required characteristics of sensitivity, definition, short margin and pattern shape even in the formation of ultrafine resist patterns of not more than half a micron. The present invention has been accomplished based on these findings.

Specifically, the present invention provides, in one aspect, a novolak resin including constitutional units represented by following Formulae (I), (II) and (III) in the molecule:

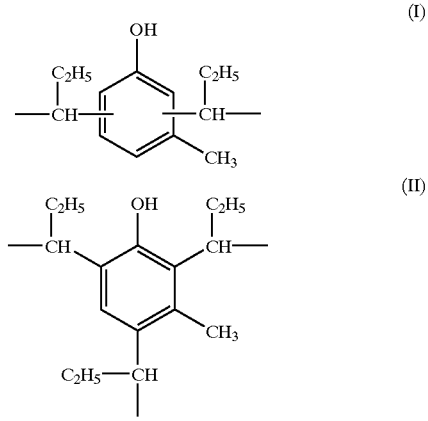

-continued

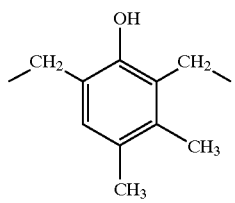
(III)

The present invention provides, in another aspect, a novolak resin that has a weight average molecular weight Mw of from 1000 to 20000 and is a reaction product of a polymer having constitutional units represented by following Formulae (I) and (II) in the molecule with 3,4-xylenol and formaldehyde:

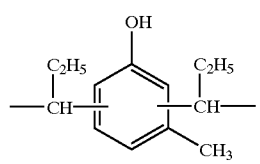
(I)

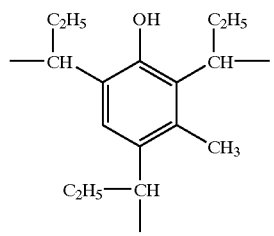
(II)

In the novolak resin just mentioned above, the polymer is preferably a reaction product of m-cresol and propionaldehyde.

In a further aspect, the present invention provides a process for producing a novolak resin. The process includes the steps of (i) allowing, as a primary reaction, propionaldehyde to react with m-cresol in the presence of an acid catalyst to thereby yield a polymer, where the amount of propionaldehyde is 0.1 to 0.5 mole per mole of m-cresol; and (ii) allowing, as a secondary reaction, the polymer to react with 3,4-xylenol and formaldehyde to thereby yield a novolak resin having a weight average molecular weight Mw of from 1000 to 20000, where the amounts of 3,4-xylenol and formaldehyde are 0.1 to 0.5 mole per mole of m-cresol and 1 to 5 moles per mole of propionaldehyde, respectively.

The present invention provides, in another aspect, a positive photoresist composition. The positive photoresist composition includes (A) the aforementioned novolak resin and (B) a naphthoquinonediazidosulfonyl ester of a phenol compound represented by following Formula (IV):

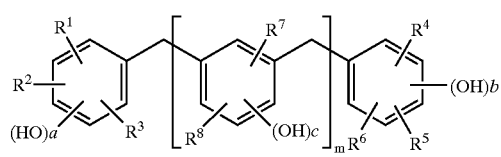
(IV)

wherein $R^1$, $R^2$, $R^3$, $R^4$, $R^5$, $R^6$, $R^7$ and $R^8$ are each independently a hydrogen atom, a halogen atom, an alkyl group having from 1 to 6 carbon atoms, an alkoxy group having from 1 to 6 atoms, or a cycloalkyl group; a, b and c are each independently an integer from 1 to 3; and m is 2 or 3.

In the positive photoresist composition, the phenol compound represented by Formula (IV) may be a linear tetranuclear phenol compound represented by following Formula (V):

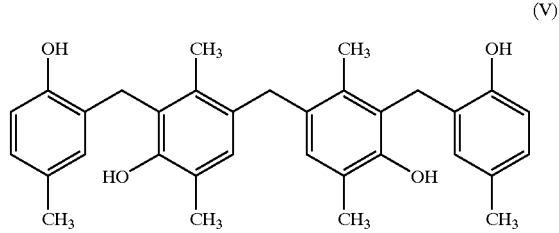
(V)

Alternatively, the phenol compound represented by Formula (IV) may be a linear pentanuclear phenol compound represented by following Formula (VI):

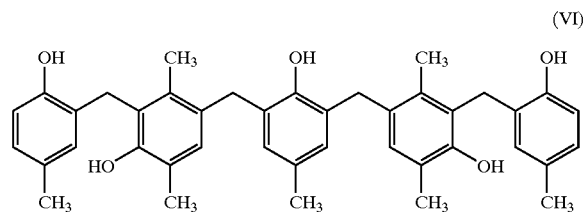
(VI)

The naphthoquinonediazidosulfonyl ester (B) is preferably a mixture of a naphthoquinonediazidosulfonyl ester of the linear tetranuclear phenol compound represented by Formula (V) and a naphthoquinonediazidosulfonyl ester of the linear pentanuclear phenol compound represented by Formula (VI).

The positive photoresist composition may further include (C) a phenol compound represented by following Formula (VII):

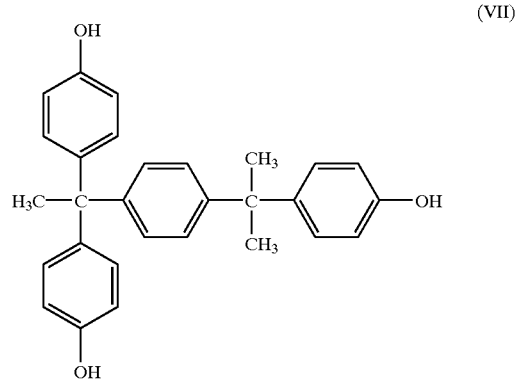
(VII)

The present invention provides such a positive photoresist compositions that satisfies all the required characteristics of sensitivity, definition, short margin and pattern shape even in the formation of ultrafine resist patterns of not more than half a micron.

The invention also provides novolak resins useful for the preparation of the positive photoresist composition and the production process of the novolak resins.

DETAILED DESCRIPTION OF THE INVENTION

Novolak Resins (A)

Novolak resins for use as the ingredient (A) in the present invention are novolak resins each having the constitutional units represented by Formulae (I), (II) and (III), respectively, in the molecule. The constitutional unit of Formula (I) is a constitutional unit formed by a reaction of two of the ortho positions and the para position of m-cresol with propionaldehyde. The constitutional unit of Formula (II) is a constitutional unit formed by a reaction of all the ortho positions and the para position of m-cresol with propionaldehyde. The constitutional unit of Formula (III) is a constitutional unit formed by a reaction of the two ortho positions of 3,4-xylenol with formaldehyde.

By using these novolak resins each having the constitutional units in the molecule, the resulting positive photoresist compositions can satisfy all the required characteristics of sensitivity, definition, short margin and pattern shape.

The novolak resins are preferably prepared by a process which includes the steps of (i) allowing, as a primary reaction, propionaldehyde to react with m-cresol in the presence of an acid catalyst to thereby yield a polymer, where the amount of propionaldehyde is 0.1 to 0.5 mole per mole of m-cresol; and (ii) allowing, as a secondary reaction, the polymer to react with 3,4-xylenol and formaldehyde to thereby yield a novolak resin, where the amounts of 3,4-xylenol and formaldehyde are 0.1 to 0.5 mole per mole of m-cresol and 1 to 5 moles per mole of propionaldehyde, respectively.

When a novolak resin is prepared in a similar manner as above, except that 3,4-xylenol is used instead of m-cresol in the step (i) and that m-cresol is used instead of 3,4-xylenol in the step (ii), the resulting novolak resin has constitutional units represented by the following formulae:

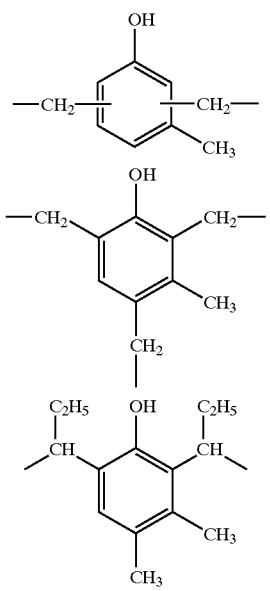

This novolak resin induces significant film reduction after development and is not suitable for the preparation of positive photoresist compositions having high definition and excellent short margin, although it has a high sensitivity.

Likewise, when a novolak resin is synthetically prepared by allowing a phenol mixture containing m-cresol and 3,4-xylenol to react with an aldehyde mixture containing formaldehyde and propionaldehyde, that is, allowing the four ingredients to react with one another at once, the resulting novolak resin is not suitable for the preparation of positive photoresist compositions having high sensitivity and definition.

In the preparation of the novolak resins of the present invention, the polymer obtained by the primary reaction is preferably a polymer having the constitutional units represented by Formulae (I) and (II) in the molecule, having a weight average molecular weight Mw of from 200 to 500 and having a molecular weight distribution Mw/Mn of less than or equal to 1.7, where Mn is a number average molecular weight. With this polymer, 3,4-xylenol is condensed with the aid of formaldehyde to thereby constitute the novolak resin.

The weight average molecular weight Mw and the number average molecular weight Mn as used herein are molecular weights in terms of polystyrene as determined by gel permeation chromatography (GPC).

The amount of propionaldehyde in the step (i) is preferably 0.1 to 0.5 mole, and typically preferably 0.2 to 0.4 mole, per mole of m-cresol. If the amount of propionaldehyde is less than the above range, the resulting positive photoresist composition may have deteriorated definition. If it exceeds the above range, the positive photoresist composition may have deteriorated sensitivity and pattern shape (i.e., the pattern may have an insufficiently vertical profile).

Acid catalysts for use in the step (i) include those generally used in the preparation of novolak resins, of which p-toluenesulfonic acid is preferred to yield a high reaction rate.

The amount of the acid catalyst is preferably from 0.1% by millimole to 100% by millimole, and typically preferably from 1% by millimole to 10% by millimole, relative to the total moles of phenolic monomers used in the preparation of the novolak resin.

The reaction in the step (i) is preferably performed in an organic solvent such as γ-butyrolactone.

The polymer prepared in the step (i) preferably has a molecular weight distribution Mw/Mn of less than or equal to 1.7 and a weight average molecular weight Mw of from about 200 to about 500 to yield a positive photoresist composition having high sensitivity and definition. The weight average molecular weight Mw of the polymer is more preferably from about 200 to about 300.

The amount of 3,4-xylenol used in the step (ii) is preferably from 0.1 to 0.5 mole and more preferably from 0.1 to 0.3 mole per mole of m-cresol used in the step (i). If the amount of 3,4-xylenol is less than the above range, the resulting positive photoresist composition may have insufficient definition. If it exceeds the above range, the positive photoresist composition may have deteriorated sensitivity and pattern shape (i.e. the pattern may have an insufficiently vertical profile).

The amount of formaldehyde used in the step (ii) is preferably from 1 to 5 moles and more preferably from 2 to 4 moles per mole of propionaldehyde used in the step (i). If the amount of formaldehyde is less than the above range, the resulting positive photoresist composition may have insufficient definition. If it exceeds the above range, the resulting positive photoresist composition may have insufficient sensitivity.

In addition to 3,4-xylenol, one or more types of phenols can be used as a third component in the step (ii).

In this case, the amounts and the types of such additional phenols as the third component are not specifically limited, as long as the compositional ratio of m-cresol to 3,4-xylenol is within the predetermined range and the characteristics of the positive photoresist composition of the present invention are not deteriorated.

In the step (i), the reaction time of the primary reaction between m-cresol and propionaldehyde is preferably more than or equal to 2 hours. If the reaction time is less than 2 hours, the core polymer formed from m-cresol and propionaldehyde may have a broad molecular weight distribution, i.e. a high Mw/Mn. Accordingly, the novolak resin obtained in the subsequent step (ii) may have insufficient characteristics and the resulting positive photoresist composition may exhibit insufficient total performances including definition, short margin, sensitivity and pattern shape (sufficient vertical profile). The reaction time of the primary reaction is preferably from about 4 hours to about 8 hours to achieve satisfactory industrial productivity.

In the step (ii), 3,4-xylenol is added to a solution mainly containing the core polymer prepared in the step (i), followed by dropwise addition of formalin (an aqueous solution of formaldehyde) at elevated temperatures to thereby start the reaction (the secondary reaction).

The reaction time of the secondary reaction is preferably from about 2 hours to about 4 hours. Within this range, the novolak resin may have a desired molecular weight and may become suitable for the preparation of positive photoresist compositions having satisfactory sensitivity, definition, short margin and vertical profile of the resist pattern. The reaction time of the secondary reaction may exceed 4 hours, but an excessively long reaction time is not desirable to yield high productivity.

The secondary reaction may be started by adding 3,4-xylenol to the solution immediately after the completion of the primary reaction, followed by dropwise addition of formalin. Alternatively, the secondary reaction may be started by cooling the reaction solution is cooled to around room temperature and stopping stirring after the completion of the primary reaction, and then adding 3,4-xylenol to the reaction solution, followed by dropwise addition of formalin.

For example, after the completion of the primary reaction, 3,4-xylenol is added before the solution is cooled, followed by cooling of the resulting mixture and stopping of stirring. Next, the mixture is raised in temperature again, followed by dropwise addition of formalin to thereby start the secondary reaction (polymerization).

Alternatively, the reaction solution is cooled after the completion of the primary reaction, 3,4-xylenol is then added to the solution, the reaction solution is then raised in temperature, followed by dropwise addition of formalin to thereby start the secondary reaction (polymerization).

Upon the start of the secondary reaction, formalin is preferably added dropwise to the reaction system at sufficiently elevated temperatures to avoid homopolymerization of formaldehyde.

The primary and secondary reactions are preferably performed at about 90° C. to 100° C. However, the primary reaction is preferably performed initially at 40° C. to 50° C. for 0.5 to 1 hour and is then performed at 90° C. to 100° C. for higher safety in the manufacture, since propionaldehyde has a boiling point of about 47° C.

Even if the primary reaction is performed at 90° C. to 100° C. from the beginning, the characteristics of the resulting resin do not have significant differences from those prepared in the aforementioned manner.

The concentrations of the total monomers in the reaction solutions of the primary and secondary reactions are preferably controlled within a range from 10% to 60% by weight using an organic solvent such as γ-butyrolactone. If the total monomer concentration is less than 10% by weight, it may take a long time for the resulting polymer to achieve a target molecular weight, and a purification process, for example, to remove the reaction solvent may become difficult. If it exceeds 60% by weight, the resulting resin may cause clogging of piping during sampling or transportation to thereby deteriorate workability.

The novolak resins of the present invention may be prepared by "bulk polymerization" without the use of an organic solvent such as γ-butyrolactone, but is preferably prepared by the above polymerization technique in an organic solvent. According to the polymerization technique, the reaction uniformly proceeds and invites less by-products.

The thus-prepared novolak resins have an Mw of preferably from 1000 to 20000 and more preferably from 2000 to 15000 to yield positive photoresist compositions having high definition and sensitivity.

Where necessary, unreacted materials and low molecular weight fractions should preferably be removed from the novolak resin by conventional purification, fractionation or other techniques to thereby yield a novolak resin having a high molecular weight and a low molecular weight distribution. The techniques for the removal are not specifically limited, but such unreacted materials and low molecular weight fractions are preferably removed in the following manner. The novolak resin solution is dissolved in methyl amyl ketone (MAK), and the resultant solution is washed with water to remove a catalyst and unreacted materials. To the residual is added a poor solvent such as hexane or heptane, or a hexane-MAK or heptane-MAK mixture, and the resultant mixture is stirred and then allowed to stand to separate a poor solvent layer containing low molecular weight fractions as an upper layer, and an MAK layer containing high molecular weight fractions as a lower layer. The lower layer is extracted and thereby yields a novolak resin having a higher molecular weight.

The positive photoresist composition of the present invention may further comprise additional alkali-soluble resins in addition to the aforementioned novolak resins within ranges not adversely affecting the objects of the invention.

Such additional alkali-soluble resins include, but are not limited to, condensates of aromatic hydroxy compounds and aldehydes or ketones, polyhydroxystyrenes and derivatives thereof. Such aromatic hydroxy compounds include, but are not limited to, phenol; p-cresol, o-cresol, and other cresols; 2,3-xylenol, 2,5-xylenol, 3,5-xylenol, and other xylenols; m-ethylphenol, p-ethylphenol, o-ethylphenol, 2,3,5-trimethylphenol, 2,3,5-triethylphenol, 4-tert-butylphenol, 3-tert-butylphenol, 2-tert-butylphenol, 2-tert-butyl-4-methylphenol, 2-tert-butyl-5-methylphenol, and other alkyl-substituted phenols; p-methoxyphenol, m-methoxyphenol, p-ethoxyphenol, m-ethoxyphenol, p-propoxyphenol, m-propoxyphenol, and other alkoxy-substituted phenols; o-isopropenylphenol, p-isopropenylphenol, 2-methyl-4-isopropenylphenol, 2-ethyl-4-isopropenylphenol, and other isopropenyl-substituted phenols; phenylphenol, and other aryl-substituted phenols; 4,4'-dihydroxybiphenyl, bisphenol A, resorcinol, hydroquinone, pyrogallol, and other polyhydroxyphenols. The aldehydes include, but are not limited to, formaldehyde, paraformaldehyde, trioxane, acetaldehyde, butyraldehyde, trimethylacetaldehyde, acrolein (acrylaldehyde), crotonaldehyde, cyclohexanealdehyde, furfural, furylacrolein, benzaldehyde, terephthalaldehyde, phenylacetaldehyde, α-phenylpropylaldehyde, β-phenylpropylaldehyde, o-hydroxybenzaldehyde, m-hydroxybenzaldehyde, p-hydroxybenzaldehyde, o-methylbenzaldehyde, m-methylbenzaldehyde, p-methylbenzaldehyde, o-chlorobenzaldehyde, m-chlorobenzaldehyde, p-chlorobenzaldehyde and cinnamaldehyde. The ketones include, for example, acetone, methyl ethyl ketone, diethyl ketone and diphenyl ketone. Each of these compounds can be used alone or in combination.

The condensate of the aromatic hydroxy compound with the aldehyde or ketone can be prepared in the presence of an acidic catalyst according to a conventional technique.

The polyhydroxystyrenes and derivatives thereof include, but are not limited to, vinylphenol homopolymers, and copolymers of vinylphenol and a copolymerizable comonomer. Such comonomers include, for example, acrylic acid derivatives, acrylonitrile, methacrylic acid derivatives, methacrylonitrile, styrene, α-methylstyrene, p-methylstyrene, o-methylstyrene, p-methoxystyrene, p-chlorostyrene, and other styrene derivatives.

The amount of these additional alkali-soluble resins is preferably less than or equal to 50% by weight and typically preferably less than or equal to 30% by weight relative to the weight of the novolak resin (A).

Naphthoquinonediazidosulfonyl Esters (B)

The positive photoresist composition of the present invention comprises the ingredient (A) and a specific naphthoquinonediazidosulfonyl ester (B). Naphthoquinonediazidosulfonyl esters of the phenol compounds represented by Formula (IV) are used as the ingredient (B).

Among these ingredients (B), naphthoquinonediazidosulfonyl esters of the linear tetranuclear phenol compound represented by Formula (V) and naphthoquinonediazidosulfonyl esters of the linear pentanuclear phenol compound represented by Formula (VI) are preferred. The ingredient (B) is more preferably a mixture containing the naphthoquinonediazidosulfonyl ester of the linear tetranuclear phenol compound represented by Formula (V) and the naphthoquinonediazidosulfonyl ester of the linear pentanuclear phenol compound represented by Formula (VI).

The naphthoquinonediazidosulfonyl esters can be prepared by subjecting, for example, a 1,2-naphthoquinonediazidosulfonyl halide and the phenol compound to condensation reaction for the complete esterification or partial esterification. The condensation reaction can be generally performed in an organic solvent in the presence of a basic condensing agent. Such organic solvents include, for example, dioxane, N-methylpyrrolidone and dimethylacetamide, and such basic condensing agents include, for example, triethylamine, alkali metal carbonates, and alkali metal hydrogencarbonates. In the resulting naphthoquinonediazidosulfonyl ester, preferably equal to or more than 50% and more preferably equal to or more than 60% of the total moles of hydroxyl groups of the phenol compound is esterified with 1,2-naphthoquinonediazido-4 (or 5)-sulfonyl halide. In other words, the naphthoquinonediazidosulfonyl ester has an average esterification rate of preferably equal to or more than 50% and more preferably equal to or more than 60%. By using such a naphthoquinonediazidosulfonyl ester, the resulting positive photoresist composition can have a higher definition.

In addition to the above naphthoquinonediazidosulfonyl esters, the positive photoresist composition of the present invention may further comprise additional naphthoquinonediazidosulfonyl esters within ranges not adversely affecting the objects of the present invention.

For example, conventional compounds used as photosensitizers in positive photoresist compositions can be used as the additional naphthoquinonediazidosulfonyl esters. Such compounds include, but are not limited to, naphthoquinonediazidosulfonyl esters of 2,4-bis(3,5-dimethyl-4-hydroxybenzyl)-5-hydroxyphenol, 2,6-bis(3,5-dimethyl-4-hydroxybenzyl)-4-methylphenol, 2,6-bis(2,5-dimethyl-4-hydroxybenzyl)-4-methylphenol, and other linear trinuclear compounds.

The positive photoresist composition of the present invention may further comprise a sensitizer (intensifier) as an ingredient (C) according to necessity. The phenol compounds represented by Formula (VII) are preferred as the ingredient (C). By adding the ingredient (C), the positive photoresist composition of the present invention can have a higher sensitivity.

Conventional sensitizers (intensifiers) can also be used in addition to, or instead of, the phenol compounds represented by Formula (VII) within ranges not adversely affecting the objects of the present invention. Such sensitizers (intensifiers) include, but are not limited to, bis(4-hydroxy-2,3,5-trimethylphenyl)-2-hydroxyphenylmethane, 1,4-bis[1-(3,5-dimethyl-4-hydroxyphenyl)isopropyl]benzene, 2,4-bis(3,5-dimethyl-4-hydroxyphenylmethyl)-6-methylphenol, bis(4-hydroxy-3,5-dimethylphenyl)-2-hydroxyphenylmethane, bis(4-hydroxy-2,5-dimethylphenyl)-2-hydroxyphenylmethane, bis(4-hydroxy-3,5-dimethylphenyl)-3,4-dihydroxyphenylmethane, 1-[1-(3-methyl-4-hydroxyphenyl)isopropyl]-4-[1,1-bis(3-methyl-4-hydroxyphenyl)ethyl]benzene, 2,6-bis[1-(2,4-dihydroxyphenyl)isopropyl]-4-methylphenol, 4,6-bis[1-(4-hydroxyphenyl)isopropyl]resorcin, 4,6-bis(3,5-dimethoxy-4-hydroxyphenylmethyl)pyrogallol, 4,6-bis(3,5-dimethyl-4-hydroxyphenylmethyl)pyrogallol, 2,6-bis(3-methyl-4,6-dihydroxyphenylmethyl)-4-methylphenol, 2,6-bis(2,3,4-trihydroxyphenylmethyl)-4-methylphenol, 1,1-bis(4-hydroxyphenyl)cyclohexane, 6-hydroxy-4a-(2,4-dihydroxyphenyl)-9-1'-spirocyclohexyl-1,2,3,4,4a,9a-hexahydroxanthene and 6-hydroxy-5-methyl-4a-(2,4-dihydroxy-3-methylphenyl)-9-1'-spirocyclohexyl-1,2,3,4,4a,9a-hexahydroxanthene.

The amount of the sensitizer (intensifier) (C) is preferably from 5% to 50% by weight and more preferably from 10% to 35% by weight, relative to the weight of the novolak resin (A).

The amount of the ingredient (B) in the positive photoresist composition of the present invention is preferably from 10% to 60% by weight and more preferably from 20% to 50% by weight relative to the total weight of the novolak resin (A) and the ingredient (C) added according to necessity. If the amount of the ingredient (B) is excessively small, the resulting positive photoresist composition may not yield images in exact accordance with the pattern and may exhibit deteriorated transfer property. If the amount is excessively large, the resulting positive photoresist composition may exhibit a deteriorated sensitivity, may yield a nonuniform resist film and may exhibit a deteriorated definition.

By comprising the specific ingredients (A) and (B), and where necessary the ingredient (C), the positive photoresist composition of the present invention satisfies all the required characteristics of sensitivity, definition, short margin and pattern shape even in the formation of ultrafine resist patterns of not more than half a micron.

To further improve definition, exposure margin and film residual rate, the positive photoresist composition of the present invention may further comprise about 0.01% to about 10% by weight each of p-toluenesulfonyl chloride (PTSC), 4,4'-bis(diethylamino)benzophenone, 1,4-bis[1-(2-methyl-4-hydroxy-5-cyclohexylphenyl)isopropyl]benzene, and/or 1,3-bis[1-(2-methyl-4-hydroxy-5-cyclohexylphenyl)isopropyl]benzene.

Where necessary, the composition of the present invention may further comprise any of compatible additives including, for example, ultraviolet absorbents for inhibition of halation and surfactants for prevention of striation within ranges not adversely affecting the objects of the invention. Such ultraviolet absorbents include, for example, 4-dimethylamino-2',4'-dihydroxybenzophenone, 5-amino-3-methyl-1-phenyl-4-(4-hydroxyphenylazo)pyrazole, 4-dimethylamino-4'-hydroxyazobenzene, 4-diethylamino-4'-ethoxyazobenzene, 4,4'-diethylaminoazobenzene and curcumin. The surfactants include, but are not limited to, Fluorad FC-430 and FC-431 (trade names, available from Fluorochemical-Sumitomo 3M Co.), EFTOP EF122A, EF122B, EF122C and EF126 (trade names, available from Tohkem Products Corporation) and other fluorine-containing surfactants.

The positive photoresist composition of the present invention is preferably used as a solution prepared by dissolving each of the ingredients (A) and (B), as well as the ingredient (C) and other additional ingredients added according to necessity, in an appropriate solvent. Such solvents include those conventionally used in positive photoresist compositions, such as acetone, methyl ethyl ketone, cyclohexanone, methyl amyl ketone, methyl isoamyl ketone, 2-heptanone and other ketones; ethylene glycol, propylene glycol, diethylene glycol, ethylene glycol monoacetate, propylene glycol monoacetate, diethylene glycol monoacetate, or monomethyl ethers, monoethyl ethers, monopropyl ethers, monobutyl ethers or monophenyl ethers of these compounds, and other polyhydric alcohols and derivatives thereof; dioxane and other cyclic ethers; and ethyl lactate, methyl acetate, ethyl acetate, butyl acetate, methyl pyruvate, ethyl pyruvate, methyl methoxypropionate, ethyl ethoxypropionate, and other esters. Each of these solvents can be used alone or in combination. Of these solvents, preferred solvents are acetone, methyl ethyl ketone, cyclohexanone, methyl isoamyl ketone, 2-heptanone and other ketones; and ethyl lactate, methyl acetate, ethyl acetate, butyl acetate, methyl pyruvate, ethyl pyruvate, methyl methoxypropionate, ethyl ethoxypropionate and other esters.

Practically, the positive photoresist composition of the present invention may preferably be used, for example, in the following manner: Each of the ingredients (A) and (B), as well as the ingredient (C) and other additional ingredients added according to necessity, is dissolved in an appropriate solvent as mentioned above to yield a coating solution; the coating solution is then applied, using a spinner or the like, onto a substrate such as a silicon wafer, and is then dried to form a photosensitive layer; next, the photosensitive layer is irradiated and is exposed with a light source emitting light of a wavelength of around 365 nm, such as a low-pressure mercury lamp, a high-pressure mercury lamp or an ultra-high-pressure mercury lamp, through a desired mask pattern; and the exposed portions of the film are then dissolved and removed by dipping the substrate in a developer solution, for example, an alkaline aqueous solution such as a 1% to 10% by weight tetramethylammonium hydroxide (TMAH) aqueous solution, thus forming an image being in exact accordance with the mask pattern.

EXAMPLES

The present invention will be illustrated in further detail with reference to several examples and comparative examples below which are not intended to limit the scope of the invention.

Synthesis Example 1

Synthesis of Novolak Resin 1

Primary Reaction

In a 1-liter four-neck flask equipped with a mechanical stirrer, a condenser tube, a 300-ml dropping funnel and a nitrogen gas supply tube, 86.4 g (0.8 mole) of m-cresol, 2.0 g of p-toluenesulfonic acid and 86.4 g of γ-butyrolactone were placed and thereby yielded a reaction solution having a concentration of 50% by weight.

Next, while supplying nitrogen gas, the flask was heated on an oil bath stirred with a magnetic stirrer. From the point of time when the internal temperature of the reaction solution reached 100° C., 12.22 g (0.2 mole) of 95% by weight propionaldehyde aqueous solution was gradually added dropwise from the dropping funnel to the reaction solution over 30 minutes; followed by a reaction for 4 hours.

The resulting reaction product was sampled and analyzed to find that it had an Mw of 250 and an Mw/Mn of 1.65.

Secondary Reaction

Next, 24.4 g (0.2 mole) of 3,4-xylenol was dissolved in 24.4 g of γ-butyrolactone and thereby yielded a solution, the resulting solution was added to the reaction solution after the primary reaction, followed by gradual dropwise addition of 52.7 g (0.65 mole) of 37% by weight formaldehyde aqueous solution over 30 minutes, and after the completion of addition, the resulting mixture was allowed to react for 10 hours.

After the completion of the reaction, the flask was sufficiently cooled to room temperature, the reaction solution was adjusted to a concentration of 20% by weight using methyl amyl ketone (MAK), was rinsed with water three times in a 3-liter separatory funnel and was concentrated using an evaporator.

The concentrate was then diluted with MAK and methanol and thereby yielded a 15% by weight solution of a polymer in MAK/methanol (weight ratio: 4/1).

The prepared solution was placed in a 3-liter separatory funnel, n-heptane was added thereto, followed by removal of low molecular weight fractions including monomers, and thereby yielded a target novolak resin having an Mw of 4000.

Synthesis Examples 2 through 5

Synthesis of Novolak Resins 2 through 5

Novolak resins 2 through 5 were prepared in the same manner as in Synthesis Example 1, except that the amounts of m-cresol, 3,4-xylenol, formaldehyde and propionaldehyde were changed as shown in Table 1.

TABLE 1

| Synthesis Example | Molar ratio of m-cresol to 3,4-xylenol | Molar ratio of formaldehyde to propionaldehyde | Mw of the resin (after fractionation) |
| --- | --- | --- | --- |
| 1 | 8:2 | 65:20 | 4000 |
| 2 | 8:2 | 70:15 | 4000 |
| 3 | 8:2 | 60:25 | 4000 |
| 4 | 9:1 | 65:20 | 4000 |
| 5 | 7:3 | 65:20 | 4000 |

Comparative Synthesis Example 1

Synthesis of Comparative Novolak Resin 1

Primary Reaction

In a 1-liter four-neck flask equipped with a mechanical stirrer, a condenser tube, a 300-ml dropping funnel and a nitrogen gas supply tube, 86.4 g (0.8 mole) of m-cresol, 2.0 g of p-toluenesulfonic acid and 86.4 g of γ-butyrolactone were placed and thereby yielded a reaction solution having a concentration of 50% by weight.

Next, while supplying nitrogen gas, the reaction solution was stirred with the mechanical stirrer, and the flask was heated on an oil bath stirred with a magnetic stirrer. From the point of time when the internal temperature of the reaction solution reached 100° C., 16 g (0.2 mole) of 37% by weight formaldehyde aqueous solution was gradually added dropwise from the dropping funnel to the reaction solution over 30 minutes, followed by a reaction for 4 hours.

Secondary Reaction

Next, 24.4 g (0.2 mole) of 3,4-xylenol was dissolved in 24.4 g of γ-butyrolactone and thereby yielded a solution, the resulting solution was added to the reaction solution after the primary reaction, followed by gradual dropwise addition of 52.7 g (0.65 mole) of 37% by weight formaldehyde aqueous solution over 30 minutes, and after the completion of addition, the resulting mixture was allowed to react for 10 hours.

After the completion of reaction, the flask was sufficiently cooled to room temperature, the reaction solution was adjusted to a concentration of 20% by weight using methyl amyl ketone (MAK), was rinsed with water three times in a 3-liter separatory funnel and was concentrated using an evaporator.

The concentrate was then diluted with MAK and methanol and thereby yielded 15% by weight solution of a polymer in MAK/methanol (weight ratio: 4/1).

The prepared solution was placed in a 3-liter separatory funnel, n-heptane was added thereto, followed by removal of low molecular weight fractions including monomers, and thereby yielded a target novolak resin having an Mw of 4000.

Comparative Synthesis Example 2

Synthesis of Comparative Novolak Resin 2

Primary Reaction

In a 1-liter four-neck flask equipped with a mechanical stirrer, a condenser tube, a 300-ml dropping funnel and a nitrogen gas supply tube, 86.4 g (0.8 mole) of m-cresol, 2.0 g of p-toluenesulfonic acid and 86.4 g of γ-butyrolactone were placed and thereby yielded a reaction solution having a concentration of 50% by weight.

Next, while supplying nitrogen gas, the flask was heated on an oil bath stirred with a magnetic stirrer. From the point of time when the internal temperature of the reaction solution reached 100° C., 12.22 g (0.2 mole) of 95% by weight propionaldehyde aqueous solution was gradually added dropwise from the dropping funnel to the reaction solution over 30 minutes; after the completion of addition, the resulting mixture was allowed to react for 4 hours.

Secondary Reaction

Next, 21.6 g (0.2 mole) of p-cresol was dissolved in 24.4 g of γ-butyrolactone and thereby yielded a solution, the resulting solution was added to the reaction solution after the primary reaction, followed by gradual dropwise addition of 52.7 g (0.65 mole) of 37% by weight formaldehyde aqueous solution over 30 minutes, and after the completion of addition, the resulting mixture was allowed to react for 10 hours.

After the completion of reaction, the flask was sufficiently cooled to room temperature, the reaction solution was adjusted to a concentration of 20% by weight using methyl amyl ketone (MAK), was rinsed with water three times in a 3-liter separatory funnel and was concentrated in an evaporator.

The concentrate was then diluted with MAK and methanol and thereby yielded a 15% by weight solution of a polymer in MAK/methanol (weight ratio: 4/1).

The prepared solution was placed in a 3-liter separatory funnel, n-heptane was added thereto, followed by removal of low molecular weight fractions including monomers, and thereby yielded a target novolak resin having an Mw of 5000.

Comparative Synthesis Example 3

Synthesis of Comparative Novolak Resin 3

In a 1-liter four-neck flask equipped with a mechanical stirrer, a condenser tube, a 300-ml dropping funnel and a nitrogen gas supply tube, 86.4 g (0.8 mole) of m-cresol, 24.4 g (0.2 mole) of 3,4-xylenol, 2.0 g of p-toluenesulfonic acid and 110.8 g of γ-butyrolactone were placed and thereby yielded a reaction solution having a concentration of 50% by weight.

Next, while supplying nitrogen gas, the reaction solution was stirred with the mechanical stirrer, and the flask was heated on an oil bath stirred with a magnetic stirrer. From the point of time when the internal temperature of the reaction solution reached 100° C., 16 g (0.2 mole) of 37% by weight formaldehyde aqueous solution was gradually added dropwise from the dropping funnel to the reaction solution over 30 minutes, followed by a reaction for 4 hours.

Next, 52.7 g (0.65 mole) of 37% by weight formaldehyde aqueous solution was gradually added dropwise to the reaction mixture over 30 minutes, followed by a reaction for 10 hours.

After the completion of reaction, the flask was sufficiently cooled to room temperature, the reaction solution was adjusted to a concentration of 20% by weight using methyl amyl ketone (MAK), was rinsed with water three times in a 3-liter separatory funnel and was concentrated using an evaporator.

The concentrate was then diluted with MAK and methanol and thereby yielded a 15% by weight solution in MAK/methanol (weight ratio: 4/1).

The prepared solution was placed in a 3-liter iseparatory funnel, n-heptane was added thereto, followed by removal of low molecular weight fractions including monomers, and thereby yielded a target novolak resin having an Mw of 4500.

Examples 1 through 5 and Comparative Examples 1 through 3

Using the above-prepared Novolak Resins 1 through 5 obtained in Synthesis Examples 1 through 5 and Comparative Novolak Resins 1 through 3 obtained in Comparative Synthesis Examples 1 through 3, Coating Solutions 1 through 5 and Comparative Coating Solutions 1 through 3 having the following composition were prepared.

| (A) Novolak Resin: | 100 parts by weight |
|---|---|
| (B) Naphthoquinonediazidosulfonyl Ester (photosensitizer): | 35 parts by weight |
| (C) Compound of Formula (VII): | 30 parts by weight |
| 4,4'-Bis(diethylamino)benzophenone: | 0.3 parts by weight |
| MAK (solvent): | 470 parts by weight |

The naphthoquinonediazidosulfonyl ester (B) just mentioned above was a mixture of an ester of the compound of Formula (V) with 1,2-naphthoquinonediazido-5-sulfonyl chloride (hereinafter referred to as "5-NQD") having an esterification rate of 50% and an ester of the compound of Formula (VI) with 5-NQD having an esterification rate of 60%. The weight ratio of the former ester to the latter ester was 1:3.

Coating Solutions 1 through 5 obtained in Examples 1 through 5 and Comparative Coating Solutions 1 through 3 obtained in Comparative Examples 1 through 3 were subjected to the following determination of characteristics. The results are shown in Table 2.

(1) Sensitivity

A sample was applied onto a silicon wafer using a spinner and was dried on a hot plate at 90° C. for 90 seconds to form a resist film 1.48 $\mu$m thick. The resist film was then exposed to light through a mask for an increasing period from 0.1 second at intervals of 0.01 second using a reducing-type projection aligner NSR-2005i 10D (available from Nikon Corporation, Japan; NA=0.57). The film was then post-exposure baked (PEB) at 110° C. for 90 seconds; was subjected to developing in a 2.38% by weight tetramethylammonium hydroxide (TMAH) aqueous solution at 23° C. for 60 seconds, was rinsed with water for 30 seconds and was dried. In this procedure, the sensitivity was defined as the exposure time period (Eop) in milliseconds (ms) to reproduce a pattern in exact accordance with the set dimensions (line width: 0.40 $\mu$m, line and space (L&S)=1:1) of the mask pattern.

(2) Definition

The definition was defined as the critical definition at an exposure which reproduced a mask pattern corresponding to 0.40-$\mu$m L&S.

(3) Short Margin

A sample was applied onto a silicon wafer using a spinner and was dried on a hot plate at 90° C. for 90 seconds to form a resist film 1.48 $\mu$m thick. The resist film was then irradiated with light through a mask (reticle) corresponding to a 0.40-$\mu$m resist pattern with L&S of 1:1 for an increasing period from 0.1 second at intervals of 0.01 second using a reducing-type projection aligner NSR-2005i 10D (available from Nikon Corporation, Japan; NA=0.57). The film was then post-exposure baked (PEB) at 110° C. for 90 sec.; was subjected to developing in a 2.38% by weight TMAH aqueous solution at 23° C. for 60 seconds, was rinsed with water for 30 seconds and was dried. In this procedure, the minimum exposure time period (Es) was defined as the exposure time period in milliseconds (ms) to reproduce separated patterns after development, and the short margin was defined as the difference between Eop and Es (Eop-Es).

(4) Pattern Shape

A sample was subjected to exposure and development at an exposure of Eop as a standard exposure and thereby yielded a resist film 1.48 $\mu$m thick having a line width of 0.40 $\mu$m with L&S of 1:1. The obtained resist pattern was subjected to a scanning electron microscope (SEM) photographic observation, and the shape of the resist pattern was evaluated according to the following criteria:

Good: The resist pattern was rectangular.

Fair: The resist pattern partially had a necked portion.

Failure: The resist pattern had a reduced top and had a tapered shape.

TABLE 2

| Example | Coating Solution | Sensitivity (Eop) (ms) | Definition ($\mu$m) | Short Margin (Eop-Es) (ms) | Pattern Shape |
|---|---|---|---|---|---|
| Ex. 1 | Sol. 1 | 240 | 0.30 | 100 | Good |
| Ex. 2 | Sol. 2 | 180 | 0.32 | 80 | Good |
| Ex. 3 | Sol. 3 | 280 | 0.32 | 80 | Fair |
| Ex. 4 | Sol. 4 | 260 | 0.32 | 80 | Good |
| Ex. 5 | Sol. 5 | 260 | 0.32 | 80 | Good |
| Com. Ex. 1 | Com. Sol. 1 | 200 | 0.35 | 80 | Fair |
| Com. Ex. 2 | Com. Sol. 2 | 240 | 0.40 | 50 | Failure |
| Com. Ex. 3 | Com. Sol. 3 | 280 | 0.32 | 60 | Fair |

Other embodiments and variations will be obvious to those skilled in the art, and this invention is not to be limited to the specific matters stated above.

What is claimed is:

1. A novolak resin comprising constitutional units represented by following Formulae (I), (II) and (III) in the molecule:

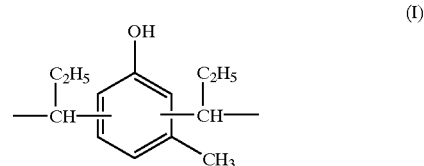

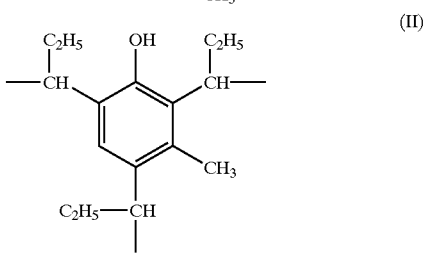

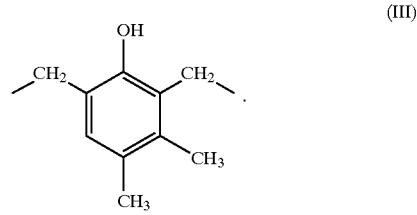

2. A novolak resin having a weight average molecular weight Mw of from 1000 to 20000 and being a reaction product of a polymer having constitutional units represented by following Formulae (I) and (II) in the molecule with 3,4-xylenol and formaldehyde:

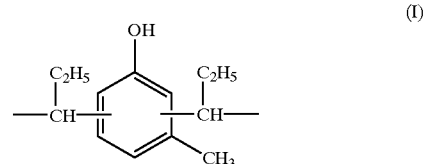

-continued

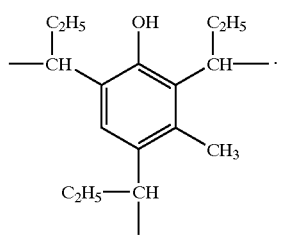
(II)

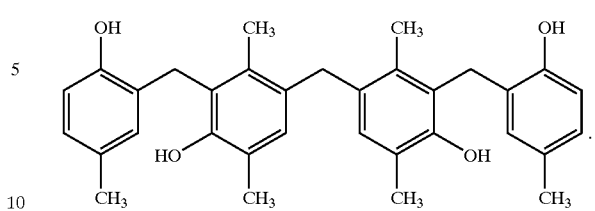
(V)

3. The novolak resin according to claim 2, wherein the polymer is a reaction product of m-cresol with propionaldehyde.

4. A process for producing a novolak resin, the process comprising the steps of:
  (i) allowing propionaldehyde to react with m-cresol in the presence of an acid catalyst as a primary reaction to thereby yield a polymer, where the amount of propionaldehyde is 0.1 to 0.5 mole per mole of m-cresol; and
  (ii) allowing the polymer to react with 3,4-xylenol and formaldehyde as a secondary reaction to thereby yield a novolak resin having a weight average molecular weight Mw of from 1000 to 20000, where the amounts of 3,4-xylenol and formaldehyde are 0.1 to 0.5 mole per mole of m-cresol and 1 to 5 moles per mole of propionaldehyde, respectively.

5. A positive photoresist composition comprising:
  (A) the novolak resin as claimed in claim 1 or 2; and
  (B) a naphthoquinonediazidosulfonyl ester of a phenol compound represented by following Formula (IV):

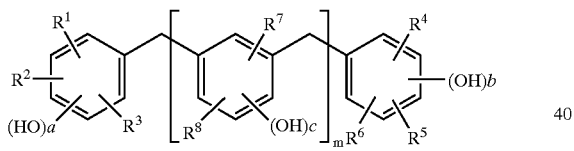
(IV)

wherein $R^1$, $R^2$, $R^3$, $R^4$, $R^5$, $R^6$, $R^7$ and $R^8$ are each independently a hydrogen atom, a halogen atom, an alkyl group having from 1 to 6 carbon atoms, an alkoxy group having from 1 to 6 carbon atoms, or a cycloalkyl group; a, b and c are each independently an integer from 1 to 3; and m is 2 or 3.

6. The positive photoresist composition according to claim 5, wherein the phenol compound represented by Formula (IV) is a linear tetranuclear phenol compound represented by following Formula (V):

7. The positive photoresist composition according to claim 5, wherein the phenol compound represented by Formula (IV) is a linear pentanuclear phenol compound represented by following Formula (VI):

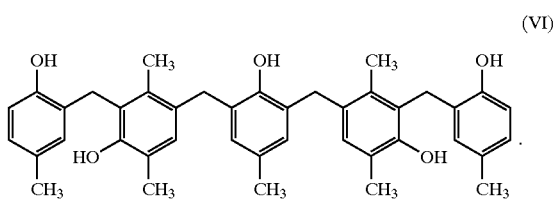
(VI)

8. The positive photoresist composition according to claim 5, wherein the naphthoquinonediazidosulfonyl ester (B) is a mixture of a naphthoquinonediazidosulfonyl ester of the linear tetranuclear phenol compound represented by Formula (V) and a naphthoquinonediazidosulfonyl ester of the linear pentanuclear phenol compound represented by Formula (VI).

9. The positive photoresist composition according to claim 5, further comprising (C) a phenol compound represented by following Formula (VII):

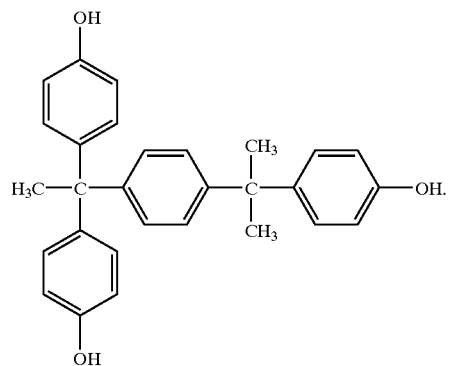

* * * * *